(12) United States Patent
Hsiao et al.

(10) Patent No.: US 10,884,432 B2
(45) Date of Patent: Jan. 5, 2021

(54) AERIAL SYSTEM AND A METHOD OF CONTROLLING AN AERIAL SYSTEM

(71) Applicant: City University of Hong Kong, Kowloon (HK)

(72) Inventors: Yi-Hsuan Hsiao, New Taipei (TW); Pakpong Chirarattananon, Kowloon (HK)

(73) Assignee: City University of Hong Kong, Kowloon (HK)

( * ) Notice: Subject to any disclaimer, the term of this patent is extended or adjusted under 35 U.S.C. 154(b) by 110 days.

(21) Appl. No.: 15/960,810

(22) Filed: Apr. 24, 2018

(65) Prior Publication Data
US 2019/0324477 A1    Oct. 24, 2019

(51) Int. Cl.
*G05D 1/04*     (2006.01)
*B64C 39/02*    (2006.01)
*B64C 27/00*    (2006.01)

(52) U.S. Cl.
CPC .......... *G05D 1/042* (2013.01); *B64C 27/006* (2013.01); *B64C 39/024* (2013.01); *B64C 2201/024* (2013.01); *B64C 2201/108* (2013.01); *B64C 2201/123* (2013.01)

(58) Field of Classification Search
CPC .... G05D 1/042; G05D 1/0005; B64C 39/024; B64C 27/006; B64C 2201/123; B64C 2201/024; B64C 2201/108; B64C 2201/14; B64D 45/04
USPC ........................................................... 701/10
See application file for complete search history.

(56) References Cited

U.S. PATENT DOCUMENTS

2010/0274461 A1*  10/2010  Wick ........................ F02C 9/28
                                                                701/100
2018/0188723 A1*   7/2018  Lee ....................... G05D 1/0094

OTHER PUBLICATIONS

Flight Level—Wikipedia.*

* cited by examiner

*Primary Examiner* — Muhammad Shafi
(74) *Attorney, Agent, or Firm* — Renner Kenner Greive Bobak Taylor & Weber

(57) ABSTRACT

An aerial system includes an energy source arranged to power a propulsion unit to operate the system at a flight level, wherein the propulsion unit is in communications with a control device arranged to detect an aerodynamic interaction between the system and a surface proximate to the flight level and control the propulsion unit by use of the detected aerodynamic interaction.

24 Claims, 8 Drawing Sheets

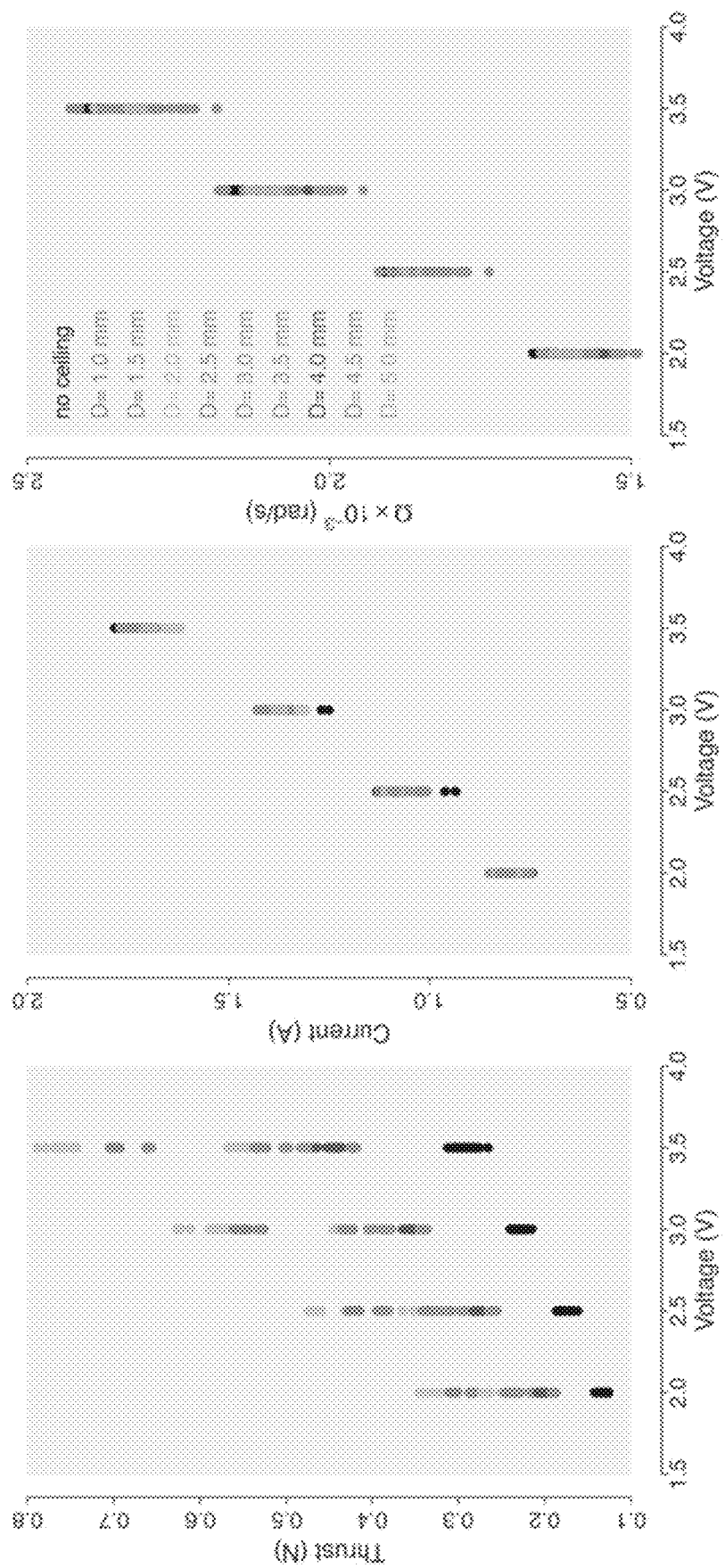

AERIAL SYSTEM AND A METHOD OF CONTROLLING AN AERIAL SYSTEM

TECHNICAL FIELD

The present invention relates to an aerial system and a method of controlling an aerial system, and particularly, although not exclusively, to an aerial system and a method of controlling an aerial system associated with an aerodynamic interaction between the system and a surface proximate to the flight level of the system.

BACKGROUND

In recent years, there has been rapid development of small human-friendly aerial vehicles. These small aerial vehicles are one of the many unmanned aerial vehicles (UAV), which carries no human pilot or passengers. Although UAVs can be fully or partially autonomous, they are more often controlled remotely by a human user. To allow the aerial vehicles to cruise at high altitudes, they are generally made of light composite materials to reduce weight and thereby increase maneuverability.

SUMMARY OF THE INVENTION

In accordance with a first aspect of the present invention, there is provided an aerial system, comprising an energy source arranged to power a propulsion unit to operate the system at a flight level, wherein the propulsion unit is in communications with a control device arranged to detect an aerodynamic interaction between the system and a surface proximate to the flight level and control the propulsion unit by use of the detected aerodynamic interaction.

In an embodiment of the first aspect, the control device comprises a sensing device for sensing the distance between the propulsion unit and the surface.

In an embodiment of the first aspect, the aerodynamic interaction between the system and the surface provides an uplifting thrust force.

In an embodiment of the first aspect, the uplifting thrust force is induced by the pressure difference across the upstream and the downstream of the propulsion unit.

In an embodiment of the first aspect, the pressure at the downstream of the propulsion unit is higher than the pressure at the upstream of the propulsion unit.

In an embodiment of the first aspect, the pressure difference across the upstream and the downstream is associated with the airflow travelling downwards and along the rotating axis of the propulsion unit.

In an embodiment of the first aspect, the airflow initially enters sideway and travels horizontally between the propulsion unit and the surface.

In an embodiment of the first aspect, the aerodynamic interaction is inversely proportional to the distance between the propulsion unit and the ceiling surface.

In an embodiment of the first aspect, the aerodynamic interaction is proportional to the rotation rate of the propulsion unit.

In an embodiment of the first aspect, the aerodynamic interaction reduces the power consumption of the energy source by the propulsion unit over a factor of 3.

In an embodiment of the first aspect, the aerodynamic interaction enhances the lift of the system by at least 2.5 times.

In an embodiment of the first aspect, the control device is arranged to control the propulsion unit for maintaining the system within a desirable range of flight level thereby optimises the power consumption of the energy source by the propulsion unit.

In an embodiment of the first aspect, the control device controls the flight level of the system based on the operating parameter of the propulsion unit and the aerodynamic interaction between the system and the surface.

In an embodiment of the first aspect, further comprises protection means extended upward and beyond the propulsion unit for protecting the propulsion unit from the collision with the surface.

In an embodiment of the first aspect, the protection means comprises a damping material.

In an embodiment of the first aspect, the damping material dampens the collision between the protective means and the surface thereby reduces the bouncing of the system.

In an embodiment of the first aspect, the damping material comprises polyurethane foam.

In an embodiment of the first aspect, the surface is a ceiling surface above the flight level of the system.

In an embodiment of the first aspect, further comprises at least one of an inspection device for inspecting an area underneath the system at the upper level, an imaging device for capturing an image at the upper level, and a communication device for communicating with a remote server at the upper level.

In accordance with a second aspect of the present invention, there is provided a method of controlling an aerial system, comprising the steps of: operating the system at a flight level by a propulsion unit; detecting an aerodynamic interaction between the system and a surface proximate to the flight level by a control device; communicating the propulsion unit with the control device; and controlling the propulsion unit by use of the detected aerodynamic interaction.

In an embodiment of the second aspect, further comprises the step of protecting the propulsion unit from the collision with the surface by protection means.

In an embodiment of the second aspect, the step of protecting the propulsion unit comprises the step of dampening the collision between the protective means and the surface thereby reduces the bouncing of the system.

In an embodiment of the second aspect, further comprises one or more of the following steps: inspecting an area underneath the system at the flight level, capturing an image at the flight level, and communicating with a remote server at the flight level.

In accordance with a third aspect of the present invention, there is provided an aerial system, comprising an energy source arranged to power a propulsion unit to operate the system at a flight level, and protection means extended upward and beyond the propulsion unit for preventing the propulsion unit from collision with a surface proximate to the flight level, wherein the propulsion unit is in communications with a control device arranged to control the flight level and the propulsion unit by use of an aerodynamic interaction between the system and the surface.

In an embodiment of the third aspect, the protection means is positioned adjacent to the propulsion unit.

In an embodiment of the third aspect, the protection means is an elongated member having a length of a predetermined size to prevent the propulsion unit from contacting the surface proximate to the flight level whilst allowing a sufficient distance between system and the surface to maintain the aerodynamic interaction.

BRIEF DESCRIPTION OF THE DRAWINGS

Embodiments of the present invention will now be described, by way of example, with reference to the accompanying drawings in which:

FIG. 6A is a plot showing the thrust force against the voltage of the aerial system in FIG. 1;

FIG. 6B is a plot showing the current against the voltage of the aerial system in FIG. 1;

FIG. 6C is a plot showing the angular velocities against the voltage of the aerial system in FIG. 1;

DETAILED DESCRIPTION OF THE PREFERRED EMBODIMENT

The inventors have, through their own research, trials and experiments, devised that flying machines, ranging from millimeter-scale flapping-wing robots, small human-friendly aerial vehicles, to a swarm of drones, have immense potential in numerous applications. Among various platforms of Micro Aerial Vehicles (MAVs), multirotor vehicles have attained wide applications because of the simple mechanical designs and inherited dynamic properties.

One of the primary challenges encountered in the application of these multirotor systems is the high energetic consumption of flight. Particularly, as the vehicle size shrinks, the low Reynolds number leads to increased viscous losses. The unfavourable scaling issue severely affects the flight endurance. For instance, existing quadrotors on the market cannot execute long-term flight mission due to the limitation of battery life, this disadvantage especially affects the performance of quadrotors which is less than 0.1 kg. As such, this acutely limits the capability of the robots, preventing the use of small MAVs for long-range missions or tasks that require an extended operational time.

In the past, the ceiling effect was considered as a disadvantage as it attracts rotorcraft the ceiling, causing an undesired collision. To reach the full potential of bimodal aerial and surface locomotion and provide an energy saving strategy for small flying robots, the inventors investigated the effects of a flat overhang surface in the vicinity of a spinning propeller and discovered that the presence of a ceiling reduces the power consumption by more than a factor of three for the same thrust force. The overall positive findings of the ceiling effect show promise, paving way for small aerial vehicles to perch on an overhang surface and radically extend the operation time.

Without adding extra power supply or changing the flying control algorithm, the present invention deploys a power saving technology by way of ceiling effect to improve the power efficiency. For instance, by providing a light structure, which is less than a few grams, on the quadrotors, the quadrotors can make significant use of the extra lift force (three times larger lift force) generated by the ceiling effect and greatly amplify the lift force on any scale of the propeller.

Figure 1:
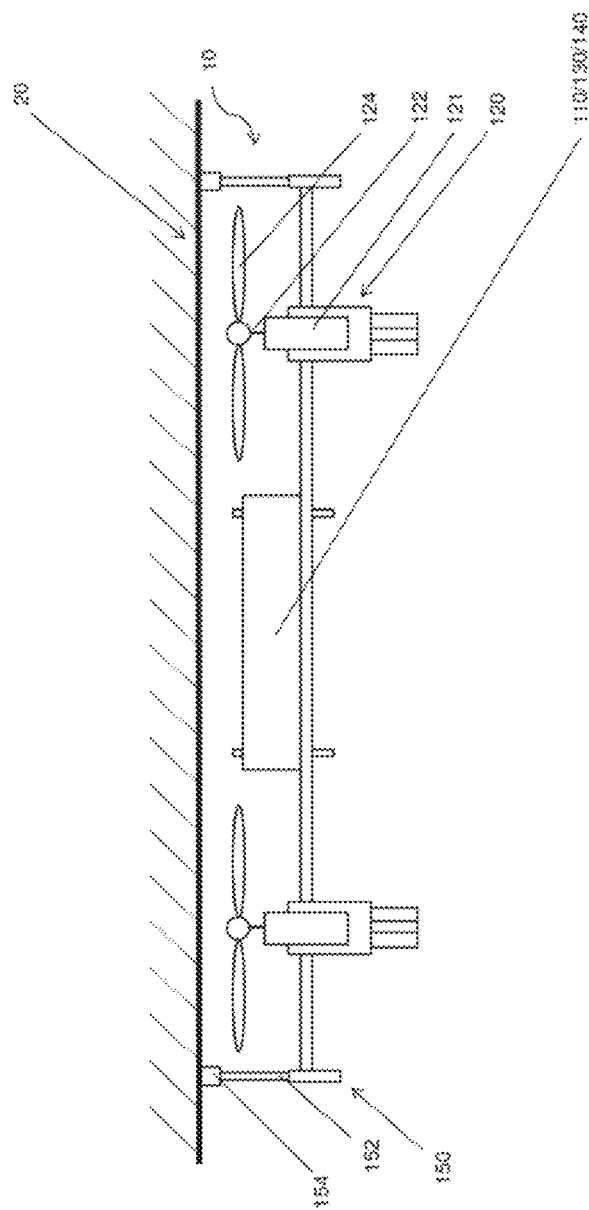
FIG. 1 is a schematic diagram showing an aerial system in accordance with one embodiment of the present invention.
Figure 2:
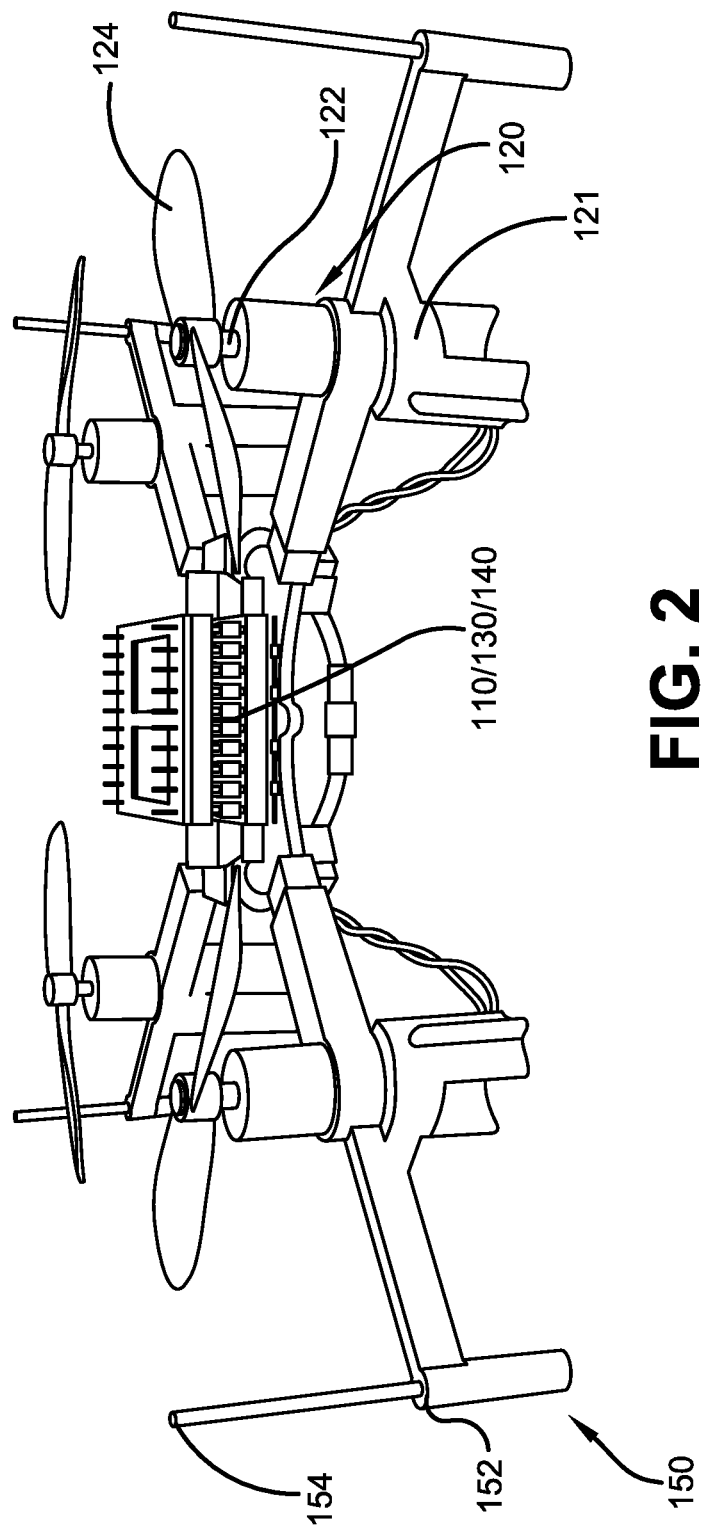
FIG. 2 is an illustration showing the aerial system in FIG. 1 at a resting position.
Figure 3:
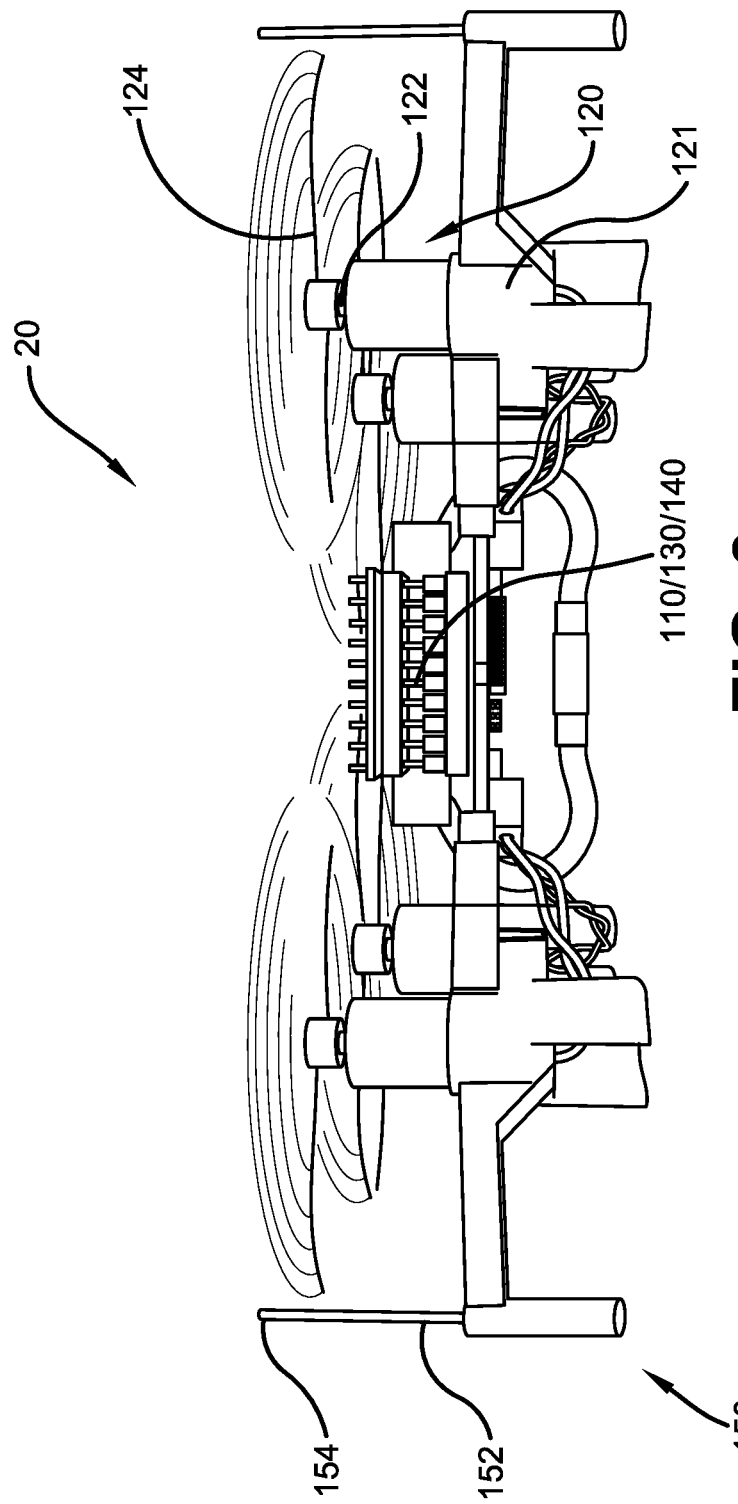
FIG. 3 is an illustration showing the aerial system in FIG. 1 operating at a flight level adjacent to a ceiling surface.

With reference initially to FIGS. 1 to 3, there is provided an example embodiment of an aerial system 10, comprising an energy source 110 arranged to power a propulsion unit 120 to operate the system 10 at a flight level, wherein the propulsion unit 120 is in communications with a control device 130 arranged to detect an aerodynamic interaction between the system 10 and a surface 20 proximate to the flight level and control the propulsion unit 120 by use of the detected aerodynamic interaction.

In one example embodiment, the aerial system 10 e.g. a quadrotor includes an energy source 110 e.g. a battery module, gasoline, petrol etc., one or more motor-driven propulsion units 120, preferably four, each having a rotating axis 122 about which a rotating blade 124 is rotated for operating the system 10 at a flight level proximate to a surface 20 e.g. a ceiling surface, and a control device 130 for controlling the propulsion units 120, thereby maintains the system 10 within a predetermined range of flight level and optimises the power consumption of the energy source 110 by the propulsion units 120. The control device 130 further includes a sensing device 140 for sensing the distance between the propulsion unit 120 and the surface 20.

In one specific embodiment, the control device 130 may control the flight level of the system 10 based on the operating parameter of the propulsion unit 120 and the aerodynamic interaction between the system 10 and the surface 20. For instance, the control device 130 may derive the aerodynamic interaction based on the sensing parameter retrieved from the sensing device 140.

Figure 4:
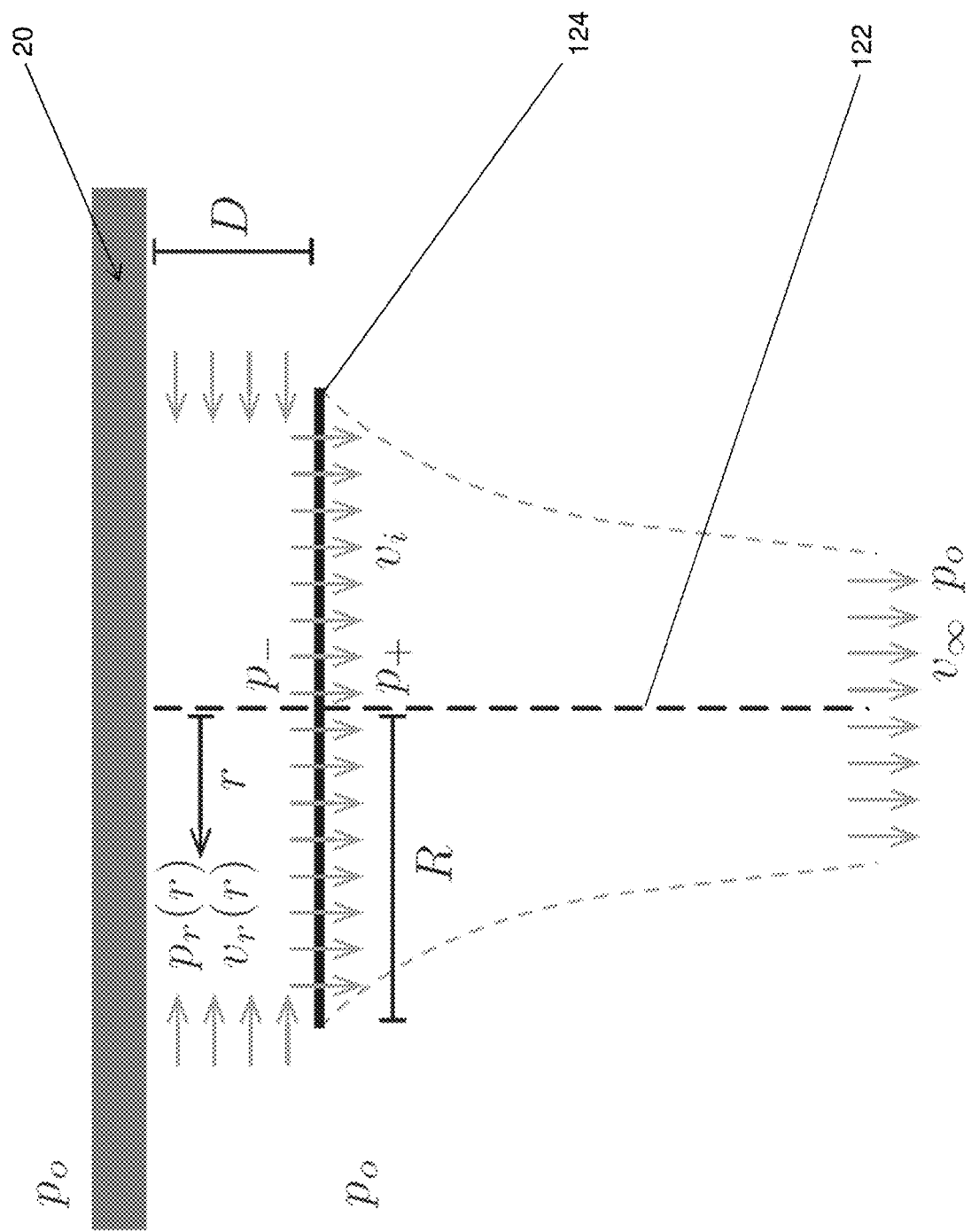
FIG. 4 is an aerodynamic model showing the aerodynamic interaction between a propeller of the system in FIG. 1 and a ceiling surface.

Referring now to the aerodynamic model as depicted in FIG. 4, a spinning rotor 124 of a propulsion unit 120 with a radius R is located at the distance D directly below a ceiling surface 20. The rotor 124 is embodied as an infinitely thin disc, neglecting the boundary layer effects and friction, and assuming the quasi-steady one-dimensional, incompressible flow. For a stationary rotor 124, such as that of the system 10 in hover, the rotating propeller 120 induces a constant airflow along the rotating axis 122 and travels downwards at the induced velocity $v_i$. This creates an abrupt change in pressure across the propeller disc 124, thereby provides an aerodynamic interaction between the propeller 120 and the surface 20.

Theoretically, the pressure at the downstream ($p_+$) of the propulsion unit 120 is higher than the pressure at the upstream ($p_-$) of the propulsion unit 120. Such pressure difference between the downstream (p+) and upstream (p−) pressures results in an uplifting thrust force $T=(p_+-p_-)A$, where $A=\pi R^2$ is the area of the propeller disk 124. The aerodynamic power $P_a$ is given by $P_a=Tv_i$.

Since the propeller 120 is situated below the ceiling 20, the upstream airflow must enter sideways. The incoming air travels horizontally and its speed, $v_r$ is uniform regardless of the distance D from the ceiling 20. This $v_r$, nevertheless, depends on the distance D to the propeller axis 122. The flow rate of the air entering the region above the propeller is $2\pi r D \cdot v_r(r)$, where r denotes the horizontal distance from the propelling axis 122. The horizontal incoming airflow must vertically exit the region through the propeller 120.

The inventors used the Bernoulli equation to determine the pressure of the air near the ceiling, $p_r(r)$ in comparison to the still air at atmospheric pressure, $p_\infty$, infinitely far away, and the pressure immediately above the propeller disc 124. In a similar manner, the inventors also determined the downstream pressure and flow velocity based on the terminal velocity $v^\infty$ of the downstream flow.

According to the momentum theory, the thrust force T is equal to the difference between the vertical momentum of the incoming and outgoing airflow. However, the presence of the ceiling 20 warrants an additional consideration. The pressure difference between the upper and lower ceiling surface 20 contributes to the vertical momentum of the airflow. Based on the above momentum theory, the inventors have devised that the aerodynamic power $P_a$ may be related to the thrust force T and represented by the following expression:

$$P_a = \gamma^{-1} T \sqrt{\frac{T}{2\rho A}} \qquad (1)$$

where $$\gamma := \frac{1}{2} + \frac{1}{2}\sqrt{1 + \frac{1}{8}\delta^2}$$

is the ceiling coefficient;
$\delta := R/D$ is the propeller-to-ceiling ratio;
$\rho$ is the air density; and
A is the area of the propeller disk 124

With the presence of the ceiling 20 (i.e. the ceiling coefficient $\gamma$ is greater than 1), the propeller 120 requires a factor of less power than that in the absence of ceiling 20 (i.e. the ceiling coefficient $\gamma$ is around 1) to generate the same thrust T. That is, the smaller the distance D between the propellers 120 and the ceiling 20 is (i.e. the greater the propeller-to-ceiling ratio $\delta$ is and hence the greater the ceiling coefficient $\gamma$ is), the bigger the lift force will be generated by the aerodynamics i.e. the aerodynamic interaction is inversely proportional to the distance D between the propulsion unit 120 and the ceiling surface 20.

Furthermore, the inventors have also considered the geometry of the propeller 120 to estimate the thrust, torque and power when the propeller 120 spins at the rate $\Omega$ by using blade element momentum theory (BEMT). By relating the induced air velocity $v_i$ to the rotational velocity $\Omega$ of the propeller 120, the inventors have also devised that the generated thrust T and the aerodynamic power $P_a$ are each proportional to the spinning rate $\Omega$ of the propeller 120 and may be represented by the following expressions:

$$T = \underbrace{2\rho A \left(\frac{2c_1 R\gamma}{1 + \sqrt{1 + 16c_2\gamma^2}}\right)^2}_{c_T} \Omega^2 \qquad (2)$$

$$P_a = c_T \Omega^3 \qquad (3)$$

$$= 2\rho A \left(\frac{2c_1 R\gamma^{2/3}}{1 + \sqrt{1 + 16c_2\gamma^2}}\right)^3 \Omega^3$$

where
$\gamma$ is the ceiling coefficient;
c1, c2 are dimensionless coefficients related to the pitch angle of the blade, the chord profile, and the number of blades;
$\rho$ is the air density;
A is the area of the propeller disk 124;
R is the radius of the spinning rotor; and
$\Omega$ is the propeller spinning rate Preferably, the inventors have also considered the mechanical power $P_m$ applied to the rotor includes losses from wake rotation, non-uniform flow, and tip vortices not captured by the momentum theory. The figure of merit $\eta$ accounts for the difference, representing the efficiency of the rotor 124 such that the aerodynamic power $P_a = \eta P_m$. This figure of merit is typically assumed constant for a particular propeller, regardless of the rotational rate.

Figure 5:
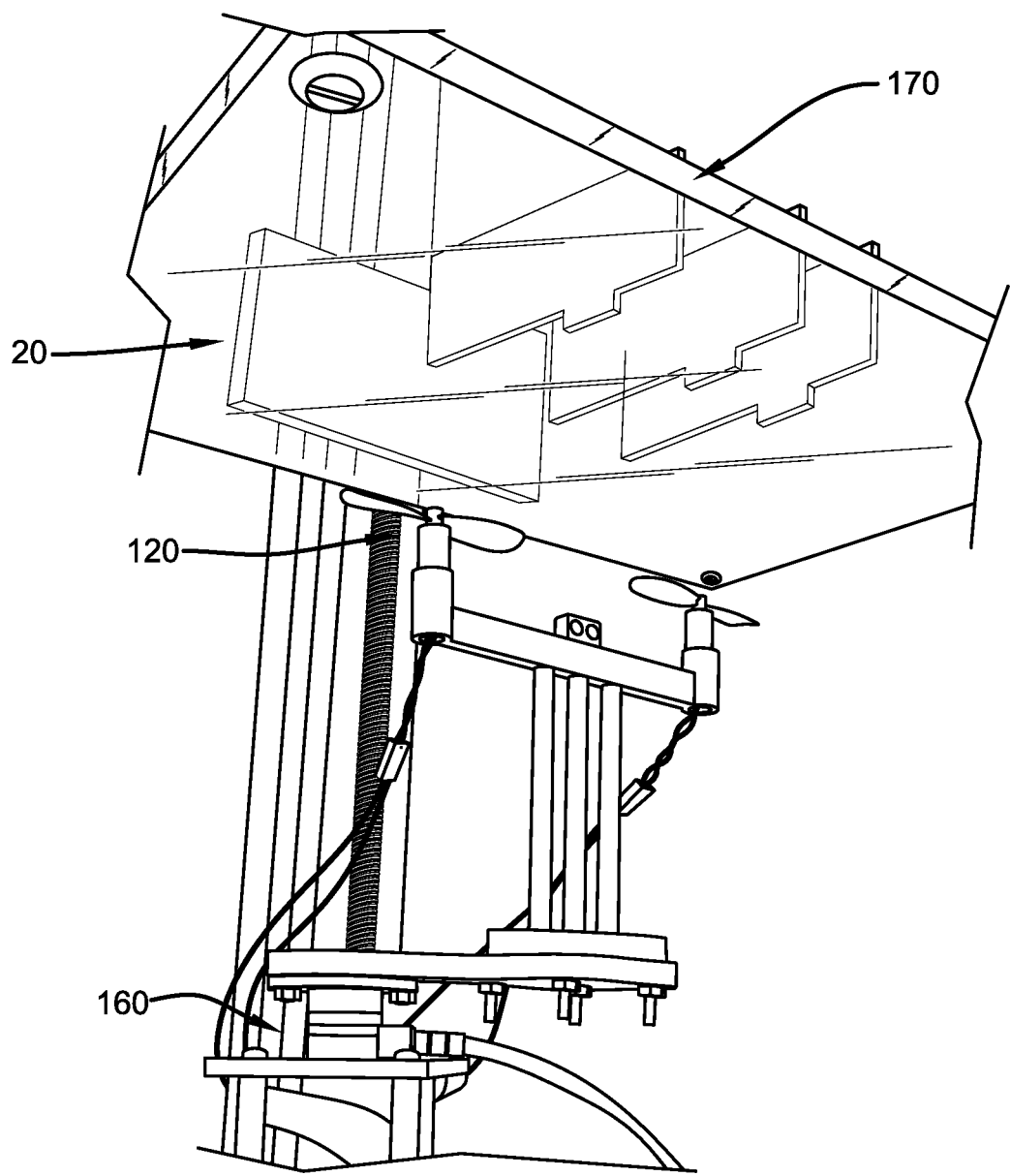
FIG. 5 is an illustration showing an example configuration for measuring the thrust force, the current and the angular velocities of the aerial system in FIG. 1.

In one example embodiment as depicted in FIG. 5, there is provided an aerial system 10 having a plurality of coreless DC motors 121 and propellers 120. A pair of motors 121 and propellers 120 with opposite spinning directions (to reduce the vibration and measurement noises) is mounted on a force sensor 160 for thrust force measurements. A transparent acrylic plate is mounted on a linear positioning stage as a ceiling 20. The distance D from the propeller 120 to the ceiling 20 is adjustable with a precision of 10 μm.

There is also provided a computing device (not shown) for generating command signals and recording the measurements. The driving commands are transmitted to an amplifying circuit for driving both motors 121. Current sensors (not shown) are incorporated to measure the current. An Advent Optical tachometer 170 with an analog output is also installed above the transparent acrylic plate 20 for providing the rotational rate $\Omega$ of the propellers 120. The measurements of current and the rotational rate $\Omega$ are recorded and synced with the force data via the computing device.

In this configuration, measurements with no ceiling 20 present and measurements at various ceiling distances D, from 1.0 mm to 5.0 mm at the increment of 0.5 mm are taken. At each distance, four commanded voltages are tested (2.0, 2.5, 3.0, and 3.5 V). At least ten tests are repeated for each voltage. In each test, the measurements of force, current, and rotational speed are collected. All data present are from the averages over two seconds and for two propellers 120.

Referring to FIGS. 6A to 6C for the measurements of thrust force, current, and angular velocities $\Omega$, the voltage increases with the thrust. At a particular voltage, a radical rise in the thrust force in the presence of the ceiling 20. For instance, at the input voltage 3.0 V, the averaged thrust measurements are 0.23 N without the ceiling 20, 0.34 N when the ceiling 20 is 5.0 mm away, and 0.59 N when the ceiling 20 is 1.0 mm away respectively. The enhancement in lift of approximately 2.5 fold when the ceiling 20 is 1.0 mm from the propellers 120 is consistent across all voltages.

On the other hand, the current measurement is minimally affected by the presence of the ceiling 20, as shown in FIG. 6B. There is only an insignificant increase in current of less than 10% at each voltage across all ceiling distances D. The introduction of the ceiling 20 does not significantly impact the power consumption of the motors 121. The measurements of the rotational rate $\Omega$ also reveal a change of rotational rate $\Omega$ of less than 10% with the presence of the ceiling 20, as shown in FIG. 6C.

Figures 7A, 7B, 7C:
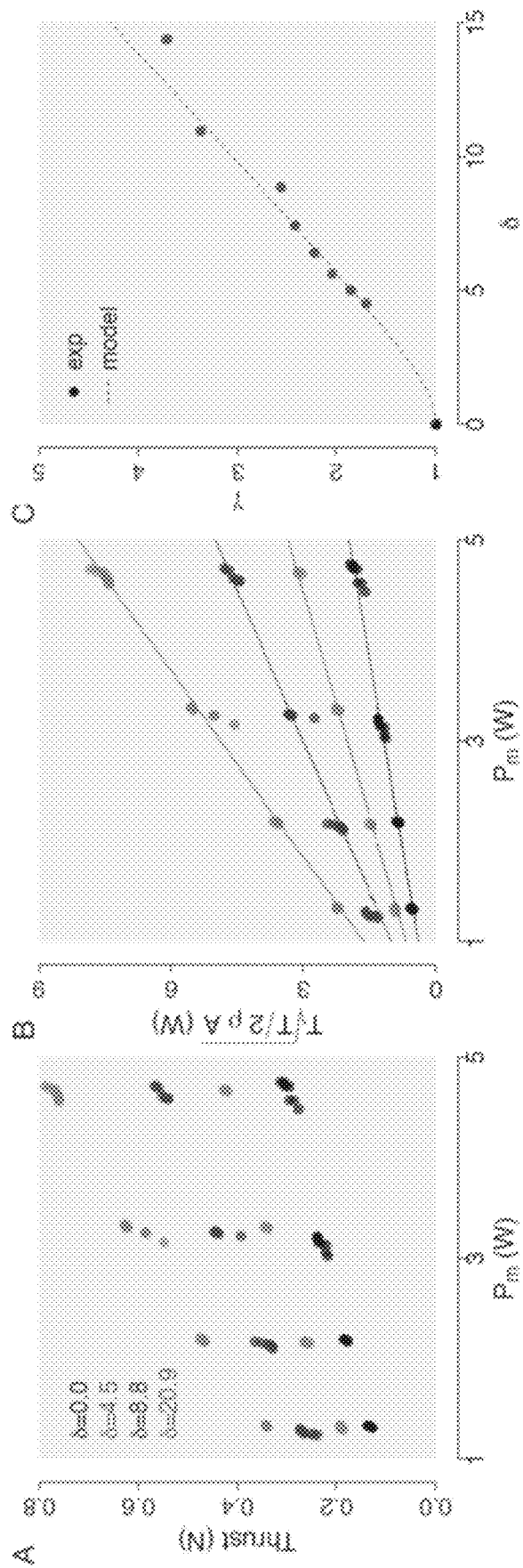
FIG. 7A is a plot showing the thrust force against the mechanical power of the aerial system in FIG. 1.
FIG. 7B is a plot showing the aerodynamic power against the mechanical power of the aerial system in FIG. 1.
FIG. 7C is a plot showing the ceiling coefficient against the propeller-to-ceiling ratio of the aerial system in FIG. 1.

Referring to FIG. 7A, there is illustrated a plot of the thrust force T against the mechanical power $P_m$ at different propeller-to-ceiling ratio $\delta$. The result verifies that the change in ceiling distance D has little effects on the mechanical power $P_m$ of the rotor 122. The mechanical power $P_m$ computed from the current and voltage measurements can be related to the aerodynamic power $P_a$ and, therefore, be related to the thrust force based on the expression (1) with the figure of merit $\eta$ defined above. FIG. 7B shows that the plots between the aerodynamic power $P_a$ and the mechanical power $P_m$ of the aerial system 10 follow a linear trend.

Based on the gradient of the best fit line in FIG. 7B, the inventors have devised that the presence of the ceiling 20 boosts the values of ceiling coefficient $\gamma$ from unity to around 2 to 3.5, implying the amplification of thrust by a factor of around 1.6 to 2.3 for the same power consumption, as illustrated in FIG. 7A. This represents the reduction in the input power by a factor around 1.6 to 2.3 for the same amount of propelling thrust. The plot of the ceiling coefficient $\gamma$ against the propeller-to-ceiling ratio $\delta$ of FIG. 7C shows that these measurements align with the above aerodynamic model.

Figure 8A:
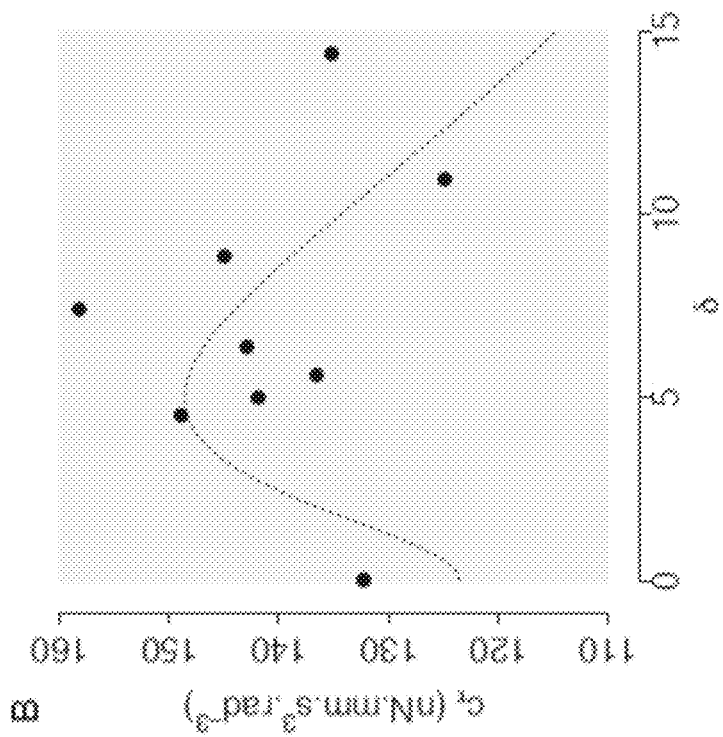
FIG. 8A is a plot showing the thrust coefficient against the propeller-to-ceiling ratio of the aerial system in FIG. 1.
Figure 8B:
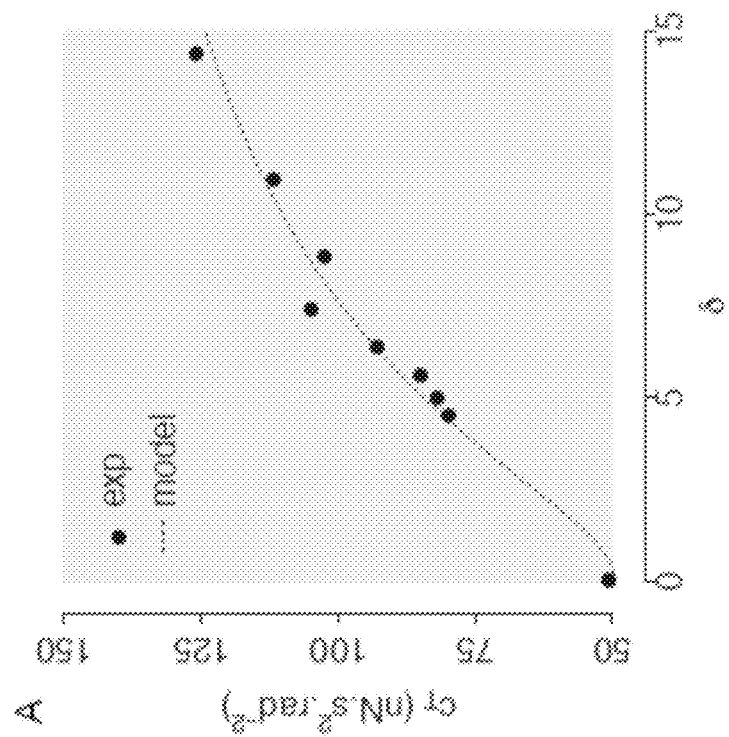
FIG. 8B is a plot showing the torque coefficient against the propeller-to-ceiling ratio of the aerial system in FIG. 1.

In one example embodiment, the measurements of thrust, power, and angular velocity are used to determine two, thrust and torque coefficients of the propeller 120 in the form of $$c_T := \frac{T}{\Omega^2} \text{ and } c_\tau := \frac{\eta P_m}{\Omega^3}$$

respectively. Without a ceiling 20, these coefficients are constant and only functions of the propeller 120 profile. To the contrary, with a ceiling 20 in proximity, the BEMT analysis suggests that these coefficients also depend on the ceiling coefficient $\gamma$. For each ceiling coefficient $\gamma$, the inventors performed the linear fitting to the above two equations to calculate the thrust and torque coefficients $C_T$, $C_\tau$ from the measurements respectively, as shown in FIGS. 8A and 8B.

For the thrust coefficient $C_T$, there presents a magnification of up to about 2.5 times when the ceiling 20 is 1.5 mm (ceiling coefficient $\gamma$ is about 15) away from the propeller 120. This is consistent with the measurements in FIGS. 5A to 5C, which represents that there is a marked increase in the thrust force and only a slight variation in the rotational speed $\Omega$ of the propeller 120 when the ceiling 20 is introduced.

Turning now to the torque coefficient $C_\tau$, there presents a minor change on the order of 20% compared to the no ceiling case. The small change in the torque coefficient $C_\tau$ implies that the propeller 120 consumes, more or less, constant power regardless of the ceiling distance D. In total, the ceiling effect contributes to a substantial improvement in thrust, without a noticeable change in the power consumption.

In one example application, the ceiling effects may be used for small rotorcraft as an energetically efficient approach for a robotic system 10 to perch on an overhang. In the proximity of a ceiling 20, the system 10 experiences a substantial increase in the generated thrust. This enables the system 10 to stay aloft in the vicinity of a ceiling 20 using significantly less power.

To efficiently utilize the generated aerodynamic attraction, the inventors further alter the design of the system 10 to include a structure, an airframe or a plurality of supporters that create and keep a small distance D between the propellers 120 and the ceiling 20 yet remains close to the ceiling 20 for benefiting from the ceiling effect and at the same time, prevent the system 10 from colliding to the surface 20.

In one example embodiment, the aerial system 10 may include protection means 150, one end of which is extended upward and beyond the propulsion unit 120 to form a supporter 152 for protecting the propulsion unit 120 from the collision with the surface 20. The supporter 152 may be made of or includes a damping material 154 e.g. polyurethane foam and serves as a first colliding point between the protective means 150 and the surface 20, such that the damping material 154 may dampen the collision between the protective means 150 and the surface 20, thereby reduces the undesired bouncing of the system 10 when the system 10 approaches the ceiling 20. This ensures that the system 10 does not bounce away due to the reaction force and ensures that the system 10 perches on the surface 20 successfully.

There is also provided an alternative example embodiment of an aerial system 10, comprising an aforesaid energy source 110 arranged to power an aforesaid propulsion unit 120 to operate the system 10 at a flight level, and protection means 150 extended upward and beyond the propulsion unit 120 for preventing the propulsion unit 120 from collision with a surface 20 proximate to the flight level, wherein the propulsion unit 120 is in communications with an aforesaid control device 130 arranged to control the flight level and the propulsion unit 120 by use of an aerodynamic interaction between the system 10 and the surface 20.

In this specific example, the aerial system 10 may be a manned helicopter. The flight journey, including the flight level, is manipulated by a pilot through a propulsion unit 120 via a control device 130. To ensure that the helicopter 10 is operated proximate to the ceiling surface 20 to benefit from aerodynamic interaction between the helicopter 10 and the ceiling 20 whilst keeping the propulsion unit 120 a safe distance from the ceiling 20, there is also provided an aforesaid protection means 150 extended upward and beyond the propulsion unit 120.

Preferably, the protection means 150 is positioned adjacent to the propulsion unit 120 and more preferably, the protection means 150 is embodied as an elongated member 152 having a length of a predetermined size to prevent the propulsion unit 120 from contacting the surface 20 proximate to the flight level whilst allowing a sufficient distance between system 10 and the surface 20 to maintain the aerodynamic interaction.

If the protection means 150 engages the ceiling 20, the pilot would be alerted of such event. In response to such unfavourable event, the pilot must lower the flight level of the helicopter 10 immediately to avoid further uplifting motion of the helicopter 10 and thus prevent the crashing of the propulsion unit 120 by the ceiling 20.

Advantageously, when a spinning propeller 120 is placed in proximity of a ceiling 20, the aerodynamic interaction between the surface 20 and the propeller 120 results in a substantial increase in the generated propelling thrust, with minimal change in the energy consumed by the driving motor 121.

Advantageously, the ceiling 20 can reduce the power consumption of a spinning propeller 120 by a factor of three while maintaining the same thrust, which is saying that the system 10 can stay right below the ceiling 20 for three times longer with the same battery life. The system 10 only need one-third of the power consumption to produce the same lift force while approaching to the ceiling 20. This offers an opportunity to address the issue of diminished flight endurance of small aerial robots, without the need of an extra actuator or sophisticated mechanism that may adversely reduce the flight time.

Advantageously, the system 10 may employ aerial and surface locomotion and/or exploit ceiling effects for perching on and/or attaching to vertical surfaces or overhang structure by way of various adhesion or surface attachment as a strategy to conserve energy and maintain a high vantage point for an extended operational time.

Advantageously, once the system 10 finishes perching, the motors will generate much lower power. Due to the ceiling effect, the system 10 may still stay at the same height under the ceiling 20 without dropping. Therefore, this may reduce the power consumption and thus provides a longer flying time. With the reduction in power consumption while perching, the robots continue to perform useful functions such as inspection, imaging, and communication.

In one alternative embodiment, the aerial system 10 may incorporate at least one of an inspection device (not shown) for inspecting an area underneath the system 10 at the upper level, an imaging device (not shown) for capturing an image at the upper level and a communication device (not shown) for communicating with a remote server at the upper level.

By implementing this power saving technology, the system 10 of the present invention may also conduct more complicated and tedious tasks, especially long-term flying mission, including the surveillance, chemical detection, and rescue attempt in the disaster.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An aerial system, comprising
an energy source arranged to power a propulsion unit to operate the system at a flight level,
wherein the propulsion unit is in communications with a control device arranged to detect, when the aerial system is operating at the flight level, an aerodynamic interaction between the system and a ceiling surface proximate to and above the flight level of the system and control the propulsion unit by use of an uplifting thrust force generated by the detected aerodynamic interaction.

2. The aerial system according to claim 1, wherein the control device comprises a sensing device for sensing the distance between the propulsion unit and the ceiling surface.

3. The aerial system according to claim 1, wherein the uplifting thrust force is induced by the pressure difference across the upstream and the downstream of the propulsion unit.

4. The aerial system according to claim 3, wherein the pressure at the downstream of the propulsion unit is higher than the pressure at the upstream of the propulsion unit.

5. The aerial system according to claim 3, wherein the pressure difference across the upstream and the downstream is associated with the airflow travelling downwards and along the rotating axis of the propulsion unit.

6. The aerial system according to claim 5, wherein the airflow initially enters sideway and travels horizontally between the propulsion unit and the ceiling surface.

7. The aerial system according to claim 1, wherein the aerodynamic interaction is inversely proportional to the distance between the propulsion unit and the ceiling surface.

8. The aerial system according to claim 1, wherein the aerodynamic interaction is proportional to the rotation rate of the propulsion unit.

9. The aerial system according to claim 1, wherein the aerodynamic interaction reduces the power consumption of the energy source by the propulsion unit over a factor of 3.

10. The aerial system according to claim 1, wherein the aerodynamic interaction enhances the lift of the system by at least 2.5 times.

11. The aerial system according to claim 1, wherein the control device is arranged to control the propulsion unit for maintaining the system within a desirable range of flight level thereby optimises the power consumption of the energy source by the propulsion unit.

12. The aerial system according to claim 11, wherein the control device controls the flight level of the system based on the operating parameter of the propulsion unit and the aerodynamic interaction between the system and the ceiling surface.

13. The aerial system according to claim 1, further comprising protection means extended upward and beyond the propulsion unit for protecting the propulsion unit from the collision with the ceiling surface.

14. The aerial system according to claim 13, wherein the protection means comprises a damping material.

15. The aerial system according to claim 14, wherein the damping material dampens the collision between the protective means and the ceiling surface thereby reduces the bouncing of the system.

16. The aerial system according to claim 14, wherein the damping material comprises polyurethane foam.

17. The aerial system according to claim 1, further comprising at least one of an inspection device for inspecting an area underneath the system at the upper level, an imaging device for capturing an image at the upper level, and a communication device for communicating with a remote server at the upper level.

18. A method of controlling an aerial system, comprising the steps of:
operating the system at a flight level by a propulsion unit;
detecting an aerodynamic interaction between the system and a ceiling surface proximate to and above the flight level of the system by a control device when the aerial system is operating at the flight level;
communicating the propulsion unit with the control device; and
controlling the propulsion unit by use of an uplifting thrust force generated by the detected aerodynamic interaction.

19. The method according to claim 18, further comprising the step of protecting the propulsion unit from the collision with the ceiling surface by protection means.

20. The method according to claim 19, wherein the step of protecting the propulsion unit comprises the step of dampening the collision between the protective means and the ceiling surface thereby reduces the bouncing of the system.

21. The method according to claim 20, further comprising one or more of the following steps: inspecting an area underneath the system at the flight level, capturing an image at the flight level, and communicating with a remote server at the flight level.

22. An aerial system, comprising
an energy source arranged to power a propulsion unit to operate the system at a flight level, and
protection means extended upward and beyond the propulsion unit for preventing the propulsion unit from collision with a ceiling surface proximate to and above the flight level of the system,
wherein the propulsion unit is in communications with a control device arranged to detect, when the aerial system is operating at the flight level, an aerodynamic interaction between the system and the ceiling surface and to control the flight level and the propulsion unit by use of an uplifting thrust force generated by the detected aerodynamic interaction between the system and the ceiling surface.

23. An aerial system in accordance with claim 22, wherein the protection means is positioned adjacent to the propulsion unit.

24. An aerial system in accordance with claim 22, wherein the protection means is an elongated member having a length of a predetermined size to prevent the propulsion unit from contacting the ceiling surface proximate to the flight level whilst allowing a sufficient distance between system and the ceiling surface to maintain the aerodynamic interaction.

* * * * *